US010889335B2

(12) United States Patent
Fischer

(10) Patent No.: US 10,889,335 B2
(45) Date of Patent: Jan. 12, 2021

(54) MOTOR VEHICLE BODY HAVING A BODYSHELL AND VEHICLE UNDERBODY, AND HAVING A SECURING STRUCTURE COMPONENT

(71) Applicant: Röchling Automotive SE & Co. KG, Mannheim (DE)

(72) Inventor: Jochem Fischer, Ostfildern (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 147 days.

(21) Appl. No.: 16/384,415

(22) Filed: Apr. 15, 2019

(65) Prior Publication Data

US 2019/0315411 A1   Oct. 17, 2019

(30) Foreign Application Priority Data

Apr. 17, 2018 (DE) .......................... 10 2018 205 826

(51) Int. Cl.
*B62D 25/20* (2006.01)
*B62D 27/02* (2006.01)
(Continued)

(52) U.S. Cl.
CPC ......... *B62D 25/2036* (2013.01); *B62D 25/04* (2013.01); *B62D 27/026* (2013.01); *B62D 29/005* (2013.01); *B62D 27/065* (2013.01)

(58) Field of Classification Search
CPC .. B62D 27/026; B62D 25/04; B62D 25/2036; B62D 29/005
(Continued)

(56) References Cited

U.S. PATENT DOCUMENTS 8,220,867 B2 * 7/2012 Mori .................. B62D 25/2036
296/209
8,690,218 B2   4/2014 Kühl et al.
(Continued)

FOREIGN PATENT DOCUMENTS

DE   10 2008 060 358 A1   8/2010

OTHER PUBLICATIONS

German Search Report for corresponding DE 10 2018 205 826.1 dated Feb. 12, 2019, 8 pgs.
(Continued)

*Primary Examiner* — Jason S Morrow
(74) *Attorney, Agent, or Firm* — Rankin, Hill & Clark LLP

(57) ABSTRACT

A motor vehicle body encompasses a surface-coated bodyshell having an underbody carrying portion and a underbody that is embodied separately from the bodyshell and is fixedly joined to the underbody carrying portion, the underbody having a planar, multiply curved underbody structure component encompassing fiber-reinforced plastic, as well as at least one underbody member, joined to the underbody structure component, having a member material different from the structural material of the underbody structure component; a support projection, on which the underbody member is braced and to which the underbody member is fixedly joined by adhesive bonding, protruding toward the vehicle interior from the underbody carrying portion; the vehicle body encompasses at least one securing structure component that is embodied separately both from the bodyshell and from the underbody and encompasses at least two limbs arranged at an angle to one another, which component is joined to the bodyshell and/or to the underbody member to secure the underbody on the bodyshell.

19 Claims, 3 Drawing Sheets

(51) Int. Cl.
*B62D 25/04* (2006.01)
*B62D 29/00* (2006.01)
*B62D 27/06* (2006.01)

(58) Field of Classification Search
USPC .......................... 296/193.05, 193.06, 203.03
See application file for complete search history.

(56) References Cited

U.S. PATENT DOCUMENTS

| | | | |
|---|---|---|---|
| 8,973,982 B2* | 3/2015 | Tabuteau | B62D 25/025 296/203.03 |
| 2008/0231078 A1* | 9/2008 | Tomozawa | B62D 25/2036 296/187.02 |
| 2014/0346814 A1* | 11/2014 | Watanabe | B62D 25/04 296/191 |
| 2014/0367996 A1* | 12/2014 | Goto | B23K 31/02 296/191 |
| 2017/0113732 A1* | 4/2017 | Lee | B62D 29/005 |
| 2018/0093710 A1* | 4/2018 | Kellner | B62D 21/152 |
| 2018/0148099 A1* | 5/2018 | Ayukawa | B62D 21/152 |
| 2019/0176723 A1* | 6/2019 | Yamashita | B62D 21/02 |
| 2020/0023905 A1* | 1/2020 | Kawase | B62D 25/025 |

OTHER PUBLICATIONS

Espacenet Bibliographic data:DE102008060358 (A1), Published Aug. 5, 2010, 1 pg.

* cited by examiner

MOTOR VEHICLE BODY HAVING A BODYSHELL AND VEHICLE UNDERBODY, AND HAVING A SECURING STRUCTURE COMPONENT

The present invention relates to a motor vehicle body that encompasses a surface-coated bodyshell having an underbody carrying portion. The motor vehicle body further encompasses a vehicle underbody that is embodied separately from the bodyshell and is fixedly joined to the underbody carrying portion. The vehicle underbody comprises a planar, multiply curved underbody structure component encompassing fiber-reinforced plastic, as well as at least one underbody member, joined to the underbody structure component, having a member material different from the structural material of the underbody structure component. Protruding toward the vehicle interior from the underbody carrying portion is a support projection on which the underbody member is braced and to which the underbody member is fixedly joined by adhesive bonding.

BACKGROUND OF THE INVENTION

The surface coating of the bodyshell is constituted as a rule by electrophoretic deposition, as is known in automobile construction in the form of cathodic or anodic dip coating. This surface coating must not be breached once it is produced.

Because of the material, a vehicle underbody having a underbody structure component encompassing a fiber-reinforced plastic will not withstand cathodic or anodic dip coating without damage. The vehicle underbody, which can be manufactured with fiber-reinforced plastic, in particular thermoplastic, so as to be lightweight and at the same time rigid and environmentally durable, therefore cannot be joined to the remainder of the bodyshell until the latter has been dip coated. It is therefore understandable that the only joining methods that can be used for joining the vehicle underbody to the bodyshell are those which do not locally attack or destroy the surface coating already produced on the bodyshell. This criterion is met by an adhesive-based joint between vehicle underbody and bodyshell.

In addition, the vehicle underbody is physically braced via the underbody member against the support projection of the underbody carrying portion of the bodyshell. In order also to impart to the underbody member the stability necessary for such bracing, the underbody member encompasses a member material that is different from the structural material of the planar underbody structure component. For that purpose, the underbody member is also embodied in terms of design differently from the planar underbody structure component, for example as a profiled material.

When the vehicle underbody and bodyshell are joined by adhesive bonding, care must be taken that loads acting on the vehicle underbody during vehicle operation can be directed along predefined load pathways into the vehicle underbody and into the vehicle body. One such load pathway is defined by the underbody member to which the underbody structure component is adhesively joined.

SUMMARY OF THE INVENTION

An object of the present invention is therefore to refine the motor vehicle body recited previously in such a way that a load pathway predefined by at least one underbody member for introducing loads into the vehicle underbody can be ensured more effectively than hitherto in the existing art.

This object is achieved according to the present invention by a motor vehicle body of the kind recited previously which encompasses at least one securing structure component that is embodied separately both from the bodyshell and from the vehicle underbody and encompasses at least two limbs arranged at an angle to one another, which component is joined to the bodyshell and/or to the underbody member in order to secure the vehicle underbody on the bodyshell.

The joining strength between the vehicle underbody and the bodyshell can be enhanced by the additional use of one or more securing structure components. To prevent damage, upon arrangement of the securing structure component, to a surface coating that is already present on the bodyshell and/or on the underbody member, the securing structure component is adhesively bonded to the respective component from among the bodyshell and/or underbody member.

The underbody member, which preferably encompasses or is a metallic hollow profile, is preferably likewise surface-coated.

Advantageously, more than just one securing structure component can be used to mount a vehicle underbody onto a bodyshell, in order to enhance the reliability and/or strength of the joint between the vehicle underbody and bodyshell. Preferably, more than one securing structure component can also be used at a given joining point between the vehicle underbody and the bodyshell, in order to enhance the reliability and/or strength of the joint at that joining point.

Depending on the application, the securing structure component can comprise exactly two limbs or also more than two limbs, in which case each two directly adjacent limbs enclose an angle between one another.

The two limbs that enclose an angle between one another do not need to be flat limbs that are delimited from one another by a sharp inflection, although that is preferred. Limbs enclosing an angle between one another can also be joined to one another by a curved joining region between the limbs. Preferably the securing structure component is a one-piece, monolithic component. It can be manufactured from plastic and/or from metal, in particular a metal sheet. A securing structure component manufactured from metal sheet can comprise, in order to stiffen it, at least one portion made of folded metal sheet.

Preferred exemplifying applications of the aforementioned securing structure component will be presented in detail below.

In accordance with a first embodiment of the present invention, for example, the securing structure component can constitute the support projection. The advantage of this embodiment is that the support projection can be arranged on the bodyshell only at a later point in time in the method for manufacturing a motor vehicle. The site at which the support projection is arranged is thus initially not fixed, and can be selected in accordance with the conformation of the vehicle underbody to be joined to the bodyshell on the bodyshell. This is achieved in terms of design by the fact that one limb of the securing structure component, constituting a joining limb, is adhesively bonded to the underbody carrying portion; and that a further limb, constituting a carrying limb, forms the support projection of the underbody carrying portion. For example, in this case the securing structure component can have an L-shaped configuration in which exactly two limbs are sufficient.

In principle, the joining limb can be adhesively bonded to the bodyshell on that side of the underbody carrying portion of the bodyshell which faces toward the vehicle underbody. It may then happen, however, that the underbody structure component and/or the underbody member must be cut out around the joining limb bonded onto the underbody carrying portion. In accordance with an advantageous refinement of the present invention, this can be avoided by the fact that the carrying limb passes through an opening in the underbody carrying portion. The underbody carrying portion preferably encompasses a portion of a side beam and/or a portion of a vertical pillar that serves to join that end region of the bodyshell which is close to the underbody to a vehicle roof and/or for later pivot-mounting of vehicle doors. The joining limb can then be adhesively bonded to that outer side of the bodyshell or of the underbody carrying portion which faces away from the interior of the vehicle constituted using the motor vehicle body.

Because beams along the yaw axis of a motor vehicle often have a curved trajectory, the joining limb can also have a curved conformation so as to join to a beam portion over the largest possible area.

In order to achieve maximum rigidity simultaneously with low weight, it is preferred that the underbody member encompass a hollow profile, for example a U-profile or a profile having a closed cross section. In order to achieve effective physical bracing of the underbody member on the carrying limb, and to achieve an effective adhesive bond between the carrying limb and underbody member, according to a preferred refinement of the present invention provision is made that the carrying limb protrudes into the hollow profile and overlaps a portion of the hollow profile in a protrusion direction, and is joined to the underbody member in the overlap region thereby formed. In addition to an adhesive bond, the underbody member can be secured on the carrying limb by a further mounting means, for example a bolt, a rivet, or a clip. The carrying limb can comprise for that purpose an insert that is secured on the carrying limb and that encompasses a mounting configuration, for example a thread or a rear engagement configuration for a rivet or a clip. Preferably such an insert is inserted into a corresponding recess on the carrying limb which has already been configured on the carrying limb before surface coating. This recess is preferably not rotationally symmetrical, so that a torque acting on the insert can be braced against the recess that surrounds the insert.

In addition or alternatively to the aforementioned use of the securing structure component to constitute the support projection, a or the securing structure component can be adhesively bonded to the bodyshell overlappingly with a securing portion of the vehicle underbody on that side of the vehicle underbody which faces away from the support projection. Overlapping of the securing portion allows the securing structure component to constitute a physical liftoff retainer to prevent the vehicle underbody from lifting off away from the support projection. The securing portion of the vehicle underbody can be constituted by the underbody structure component and/or by the underbody member. Because of the greater local component strength, it is preferably constituted by the underbody member.

In terms of design, the securing structure component can be used as a physical liftoff retainer by the fact that one limb of the securing structure component, constituting a fastening limb, is adhesively bonded to the underbody carrying portion; and that a further limb, constituting a holding limb, overlaps the securing portion of the vehicle underbody. The fastening limb is preferably adhesively bonded to a vertical pillar. The vertical pillars in a bodyshell often have a roughly U-shaped cross section orthogonally to their longitudinal pillar axis, having two U-limbs that are joined by a central U-base and protrude in the same direction from the U-base. The fastening limb is preferably adhesively bonded to one of the U-limbs. Particularly preferably, the vertical pillar is a B-pillar, so that the underbody member secured in the region of the B-pillar can also serve as a seat support for mounting vehicle seats in the interior of the vehicle constituted from the motor vehicle body.

For particularly solid joining of the securing structure component to the underbody carrying portion, in particular to a vertical pillar, of the bodyshell, the securing structure component can preferably comprise three limbs, of which each two directly adjacent limbs enclose an angle with one another. The holding limb is then preferably joined at each of its two oppositely located longitudinal ends to a respective fastening limb, each of which is adhesively bonded to the underbody carrying portion, in particular to a vertical pillar, particularly preferably to a B-pillar. The holding limb is then located between the two fastening limbs.

As has already been discussed above, the vertical pillar preferably has an open cross section, for example the aforementioned preferred U-profile. The securing structure component is therefore preferably joined to a vertical pillar having an open cross section, particularly preferably in such a way that the holding limb together with the vertical pillar forms a closed peripheral cross section in the region where the securing structure component is arranged. The result is that not only physical liftoff retention but also local stiffening of the vertical pillar can be achieved.

In accordance with a further additional or alternative application possibility, a or the securing structure component can be adhesively bonded to the underbody member overlappingly with a doubling portion of the underbody member. The wall thickness of the underbody member can thus be locally increased, and fastening thereof onto the bodyshell thereby simplified.

The underbody member can be a crossmember or a longitudinal member, i.e. a member that proceeds substantially in a transverse vehicle direction (crossmember) or in a longitudinal vehicle direction (longitudinal member) in the vehicle constituted from the motor vehicle body. As a rule, the vehicle underbody will comprise several underbody members, some of which are longitudinal members and some others crossmembers. Each of these underbody members can be secured at its longitudinal end region on the bodyshell, in the manner described above, by way of one or several of the aforementioned securing structure components.

The underbody member is preferably manufactured from metal, in particular sheet metal. The underbody structure component can encompass or be an LWRT ply, i.e. a ply made of porous, partly compacted entangled fiber material bonded with thermoplastic material. The underbody structure component preferably also encompasses a metal ply, for example an aluminum ply, for example in the thickness range from 0.6 to 1.5 mm. Particularly preferably, the underbody structure component encompasses or is a sandwich composite structure having an LWRT ply arranged between two metal plies.

As already discussed, the support projection, but additionally or alternatively also the securing structure component, can comprise an insertion component made of plastic, preferably for reduced stress on the surface coating, which comprises a mounting configuration for mounting a mounting component, for example a bolt, clip, rivet, and the like. This applies especially to the securing structure component that overlaps a doubling portion of the underbody member.

The insertion component can also be implemented, however, on the other embodiments of a securing structure component which are described.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
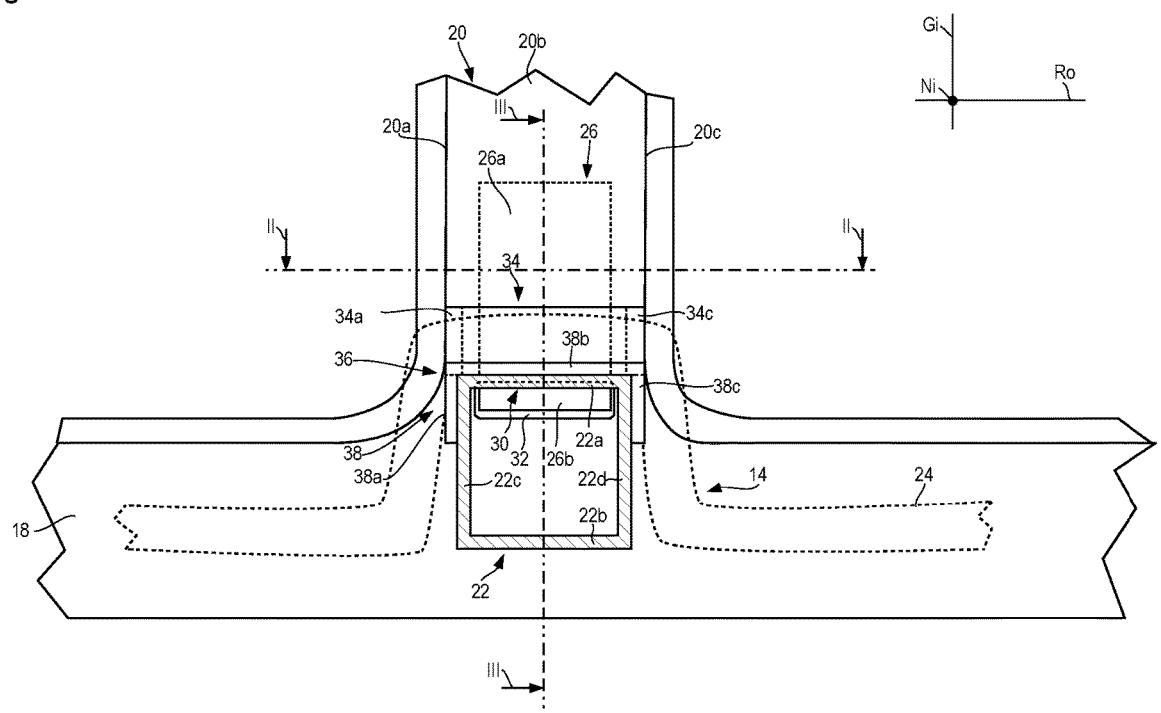
FIG. 1 is a schematic partly sectioned view of a portion of a motor vehicle body according to the present invention showing a vehicle underbody joined to an underbody carrying portion of a bodyshell, looking at a section plane I-I in FIGS. 2 and 3 which is orthogonal to the transverse direction (pitch axis) of the vehicle constituted from the motor vehicle body.
Figure 2:
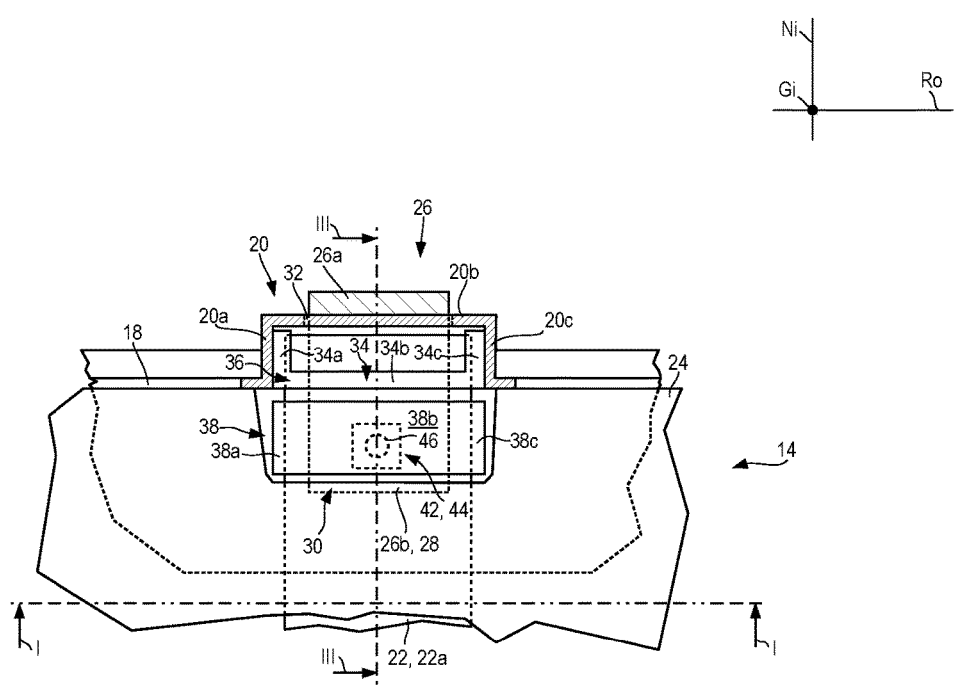
FIG. 2 is a schematic partly sectioned view of the motor vehicle body of FIGS. 1 and 3, looking at a section plane II-II in FIGS. 1 and 3 which is orthogonal to the vertical direction (yaw axis) of the vehicle constituted from the motor vehicle body.
Figure 3:
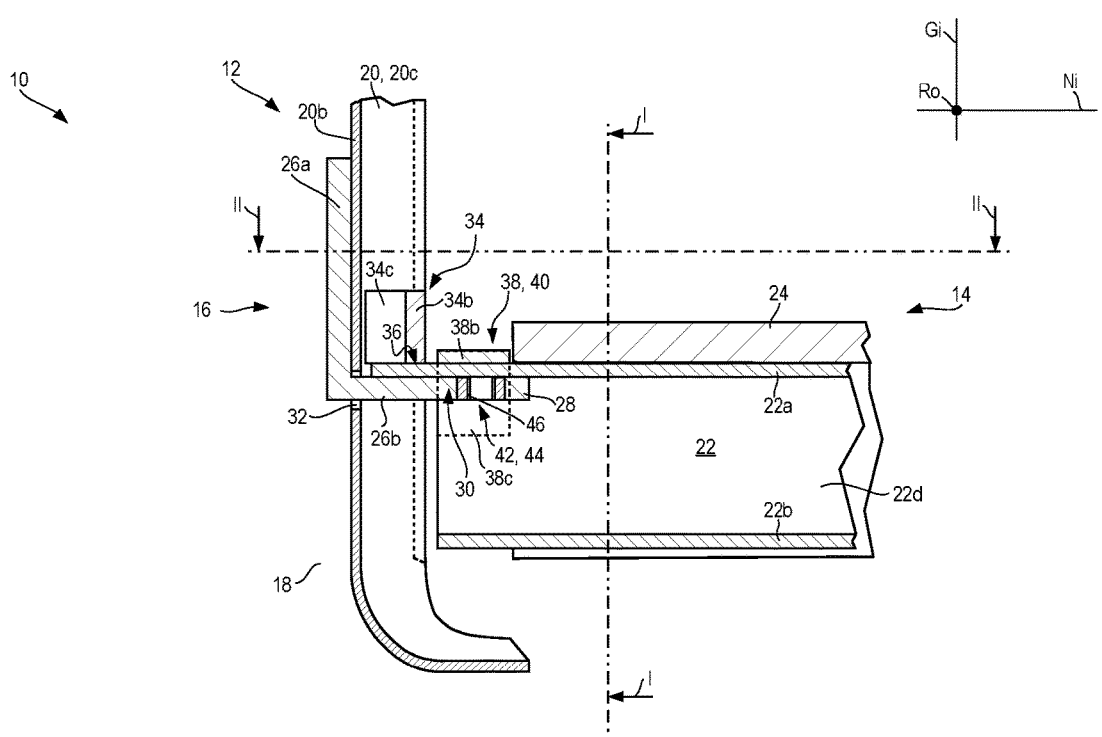
FIG. 3 is a schematic partly sectioned view of the motor vehicle body of FIGS. 1 and 2, looking at a section plane III-III in FIGS. 1 and 2 which is orthogonal to the longitudinal direction (roll axis) of the vehicle constituted from the motor vehicle body.

Referring now to the drawings wherein the showings are for the purpose of illustrating preferred and alternative embodiments of the invention only and not for the purpose of limiting the same, in FIGS. 1 to 3, an embodiment according to the present invention of a motor vehicle body is shown schematically and in portions and is labeled with the number 10. Motor vehicle body 10 encompasses a bodyshell 12 and a vehicle underbody 14. Bodyshell 12 is surface-coated by cathodic dip coating. The surface coating thereby formed must not be breached once it has been manufactured. Vehicle underbody 14, on the other hand, has no such integrity-sensitive surface coating. It has not participated in the cathodic dip coating of bodyshell 12.

A Cartesian coordinate system encompassing a roll axis Ro, a pitch axis Ni, and a yaw axis Gi of the vehicle constituted from motor vehicle body 10 is depicted in FIGS. 1 to 3 for better orientation.

An underbody carrying portion 16 of bodyshell 12, encompassing a side beam 18 and a B-pillar 20, is depicted. Vehicle underbody 14 encompasses an underbody member 22 and a multiply curved planar underbody structure component 24 which is joined thereto and is depicted in FIG. 1 merely with dashed lines so as not to conceal those portions of underbody carrying portion 16 which are located behind it. Underbody structure component 24 encompasses two metal plies made of aluminum (not individually depicted in the Figures) between which is arranged an LWRT material constituting a fiber-reinforced plastic ply. The LWRT material is the reason why underbody structure component 24 cannot be surface-coated in the same way as bodyshell 12. Underbody member 22, on the other hand, is surface-coated, likewise by cathodic dip coating, but was surface-coated as a separate component and not together with bodyshell 12. Vehicle underbody 14 is a component that is preassembled or prefabricated from several underbody members 22 and the planar underbody structure component 24.

As depicted in FIG. 1, a rectangular hollow profile is selected, by way of example, as underbody member 22. Underbody structure component 24 rests on upper lateral surface 22a of underbody member 22 and in addition is adhesively bonded to underbody member 22. Upper lateral surface 22a of underbody member 22 proceeding parallel to pitch axis Ni is longer in that direction than the remaining lateral surfaces 22b to 22d.

The rectangular hollow profile is selected only by way of example, however. Underbody member 22 could also comprise a U-shaped hollow profile, in which case, for example, lower lateral surface 22b located oppositely from upper lateral surface 22a could be omitted.

A first securing structure component 26 encompasses two limbs 26a and 26b that enclose an angle between one another. Limb 26a, constituting a joining limb, is adhesively bonded to the outer side of B-pillar 20, i.e. the side that faces away from the later vehicle interior of a vehicle constituted from motor vehicle body 10.

The other limb 26b, which protrudes from joining limb 26a, is a carrying limb 26b that constitutes a support projection 28 on which underbody member 22 rests with its upper lateral surface 22a. The two surface portions, located directly opposite one another and overlapping along an overlap region 30, of support projection 28 on the one hand and of upper lateral surface 22a of underbody member 22 on the other hand, are joined to one another by adhesive bonding.

Carrying limb 26b passes through an opening 32 in underbody carrying portion 16, in the example depicted in the transition region between beam 18 and B-pillar 20. Joining limb 26a thus does not interfere on that side of bodyshell 12 which faces toward what is later the vehicle interior. Securing structure component 26 can therefore also be provided at almost any desired locations on bodyshell 12, signifying an advantageously high degree of design freedom in the placement of support projection 28.

To further enhance the reliability and strength of the joint between underbody member 22 and underbody carrying portion 16, in the exemplifying embodiment depicted a second securing structure component 34 is provided, in addition to first securing structure component 26, as a physical liftoff retainer to prevent underbody member 22 from lifting off away from support projection 28 along yaw axis Gi.

Unlike first securing structure component 26, second securing structure component 34 comprises three limbs 34a, 34b, and 34c.

Second securing structure component 34 is joined to underbody carrying portion 16 by adhesive bonding. Limbs 34a and 34c that are end-located in the longitudinal direction of securing structure component 34 constitute fastening limbs 34a and 34c that are adhesively bonded to respective U-shaped limbs 20a and 20c of B-pillar 20 constituted from a longitudinal profile having a roughly U-shaped cross section. Limb 34b located between fastening limbs 34a and 34c is a holding limb 34b that overlaps a securing portion 36 of vehicle underbody 14 (more precisely, in the exemplifying embodiment, of underbody member 22) on its side facing away from support projection 28. Holding limb 34b thus constitutes a physical barrier that prevents underbody member 22, and thus vehicle underbody 14, from lifting off away from support projection 28. In order to constitute the securing portion, upper lateral surface 22a is embodied to be longer than the other lateral surfaces of the underbody member, so that the longer lateral surface 22a projects into the region surrounded by the U-shaped profile of B-pillar 20.

At the point at which holding limb 34b is arranged in B-pillar 20, it supplements the U-shaped cross section of B-pillar 20 to yield a closed hollow profile. B-pillar 20 can thus be additionally locally stiffened by securing structure component 34.

A further, third securing structure component 38 that serves to locally increase the material thickness of underbody member 22 is arranged at the joining point shown in FIGS. 1 to 3 between vehicle underbody 14 and bodyshell 12.

Third securing structure component 38, which, like second securing structure component 34, has a roughly C-shaped conformation, encompasses three limbs 38a, 38b, and 38c. Securing structure component 38 fits around underbody member 22 externally on three sides 22a, 22c, and 22d along a doubling portion 40. Underbody member 22 can thereby be locally stiffened and/or can acquire a material thickness that can also serve for mounting a mounting component, for example a bolt or clip.

For example, to allow a bolt to be threaded into carrying limb 26b without thereby damaging securing structure component 26 that is possibly surface-coated, a recess 42, for example a rectangular recess 42, can be constituted in securing structure component 26, in which recess an insertion component 44, for example constituting a plastic insert, having an internal thread 46 embodied therein and constituting a mounting configuration, can be arranged (see only FIGS. 2 and 3). Insertion component 44 is preferably adhesively bonded captively into rectangular recess 42.

In the exemplifying embodiment, insertion component 44 is depicted on carrying limb 26b merely for illustration. An insertion component of this kind, or a structurally similar one, can also be provided on securing structure component 34 and/or 38.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A motor vehicle body encompassing a surface-coated bodyshell having an underbody carrying portion and encompassing a vehicle underbody that is embodied separately from the bodyshell and is fixedly joined to the underbody carrying portion, the vehicle underbody comprising a planar, multiply curved underbody structure component encompassing fiber-reinforced plastic, as well as at least one underbody member, joined to the underbody structure component, having a member material different from the structural material of the underbody structure component; a support projection, on which the at least one underbody member is braced and to which the at least one underbody member is fixedly joined by adhesive bonding, protruding toward the vehicle interior from the underbody carrying portion, the motor vehicle body encompasses at least one securing structure component that is embodied separately both from the bodyshell and from the vehicle underbody and encompasses at least two limbs arranged at an angle to one another, the at least one securing structure component being joined to at least one of the bodyshell and the at least one underbody member in order to secure the vehicle underbody on the bodyshell.

2. The motor vehicle body according to claim 1, wherein the at least two limbs of the at least one securing structure component includes a joining limb and a carrying limb, the joining limb being adhesively bonded to the underbody carrying portion; the carrying limb forms the support projection of the underbody carrying portion.

3. The motor vehicle body according to claim 2, wherein the carrying limb passes through an opening in the underbody carrying portion.

4. The motor vehicle body according to claim 3, wherein the carrying limb passes through an opening in at least one of a beam and a vertical pillar in the underbody carrying portion.

5. The motor vehicle body according to claim 2, wherein the at least one underbody member encompasses a hollow profile, the carrying limb protruding into the hollow profile and overlapping a portion of the hollow profile in a protrusion direction, and being joined to the at least one underbody member in an overlap region thereby formed.

6. The motor vehicle body according to claim 5, wherein the hollow profile is at least one of U-profile and a profile having a closed cross section.

7. The motor vehicle body according to claim 5, wherein the carrying limb protruding into the hollow profile is joined to the at least one underbody member by at least one of adhesive bonding, bolting and clipping in the overlap region thereby formed.

8. The motor vehicle body according to claim 1, wherein the at least one securing structure component is adhesively bonded to the bodyshell overlappingly with a securing portion of the vehicle underbody on a side of the vehicle underbody which faces away from the support projection.

9. The motor vehicle body according to claim 8, wherein the at least two limbs of the at least one securing structure component includes a fastening limb and a holding limb, the fastening limb being adhesively bonded to the underbody carrying portion; the holding limb overlaps the securing portion of the vehicle underbody.

10. The motor vehicle body according to claim 9, wherein the fastening limb is adhesively bonded to a vertical pillar.

11. The motor vehicle body according to claim 9, wherein the at least one securing structure component comprises three limbs, of which each two directly adjacent limbs enclose an angle with one another, the holding limb being joined at each of its two longitudinal ends to a respective fastening limb, each of which is adhesively bonded to the underbody carrying portion.

12. The motor vehicle body according to claim 11, wherein the three limbs are each adhesively bonded to a vertical pillar of the underbody carrying portion.

13. The motor vehicle body according to claim 9, wherein the at least one securing structure component is joined to a vertical pillar having an open cross section, the holding limb together with the vertical pillar forming a closed peripheral cross section in a region where the at least one securing structure component is arranged.

14. The motor vehicle body according to claim 1, wherein the at least one securing structure component is adhesively bonded to the at least one underbody member overlappingly with a doubling portion of the at least one underbody member.

15. The motor vehicle body according to claim 1, wherein the at least one underbody member is a crossmember or a longitudinal member.

16. The motor vehicle body according to claim 15, wherein at least one of the at least one underbody member is made of metal and the underbody structure component encompasses or is an LWRT ply.

17. The motor vehicle body according to claim 15, wherein at least one of the at least one underbody member is made of sheet metal and the underbody structure component encompasses or is a metal ply having an LWRT ply arranged between two metal plies.

18. The motor vehicle body according to claim 1, wherein at least one of the support projection and the at least one securing structure component comprises an insertion component which comprises a mounting configuration for mounting a mounting component.

19. The motor vehicle body according to claim 18, wherein the insertion component is made up of a plastic insert, the mounting component including at least one of a bolt, a clip and a rivet.

\* \* \* \* \*